United States Patent
Robertson et al.

(10) Patent No.: US 11,418,861 B2
(45) Date of Patent: Aug. 16, 2022

(54) OPTICAL SWITCHING UNIT

(71) Applicant: Huber+Suhner Polatis Limited, Cambridge (GB)

(72) Inventors: Brian Robertson, Cambridge (GB); Daping Chu, Cambridge (GB); Haining Yang, Nanjing (CN)

(73) Assignee: Huber+Suhner Polatis Limited, Cambridge (GB)

( * ) Notice: Subject to any disclaimer, the term of this patent is extended or adjusted under 35 U.S.C. 154(b) by 0 days.

(21) Appl. No.: 16/973,135

(22) PCT Filed: Jun. 7, 2019

(86) PCT No.: PCT/GB2019/051592
§ 371 (c)(1),
(2) Date: Dec. 8, 2020

(87) PCT Pub. No.: WO2019/234448
PCT Pub. Date: Dec. 12, 2019

(65) Prior Publication Data
US 2021/0258662 A1    Aug. 19, 2021

(30) Foreign Application Priority Data
Jun. 8, 2018  (GB) ..................................... 1809490

(51) Int. Cl.
*H04Q 11/00*    (2006.01)
*H04J 14/02*    (2006.01)

(52) U.S. Cl.
CPC ...... *H04Q 11/0005* (2013.01); *H04J 14/0212* (2013.01); *H04Q 2011/0016* (2013.01); *H04Q 2011/0032* (2013.01); *H04Q 2011/0035* (2013.01)

(58) Field of Classification Search
CPC .................................................. H04Q 11/0005
See application file for complete search history.

(56) References Cited

U.S. PATENT DOCUMENTS

| | | | |
|---|---|---|---|
| 5,491,762 | A | 2/1996 | Deacon et al. |
| 5,724,165 | A | 3/1998 | Wu |
| 6,978,061 | B1 | 12/2005 | Tabuchi |

(Continued)

FOREIGN PATENT DOCUMENTS

| | | |
|---|---|---|
| EP | 1914587 | 4/2008 |
| EP | 3318906 | 5/2018 |

(Continued)

OTHER PUBLICATIONS

Hu et al., "Polarization independent liquid crystal gratings based on orthogonal photoalignments", Applied Physics Letters 100, Mar. 2012 (Year: 2012).*

(Continued)

*Primary Examiner* — Shi K Li
(74) *Attorney, Agent, or Firm* — Kilpatrick Townsend & Stockton LLP (57) ABSTRACT

An optical switching unit comprising: a plurality of arrays of multiple optical waveguides; and a switching structure controllable to direct light received from any of the optical waveguides in a first array of the plurality of arrays to one or more optical waveguides of each other array in the plurality of arrays.

17 Claims, 8 Drawing Sheets

(56) References Cited

U.S. PATENT DOCUMENTS

| | | | |
|---|---|---|---|
| 2006/0067611 A1* | 3/2006 | Frisken | G02B 6/29313 385/16 |
| 2008/0226216 A1* | 9/2008 | Corem | G02F 1/093 385/11 |
| 2008/0298738 A1 | 12/2008 | Ishikawa et al. | |
| 2010/0172646 A1* | 7/2010 | Colbourne | G02B 6/3518 398/49 |
| 2011/0234951 A1* | 9/2011 | Cohen | G02B 6/29311 349/113 |
| 2013/0209030 A1 | 8/2013 | Colbourne | |
| 2015/0208144 A1* | 7/2015 | Holmes | H04Q 11/0003 398/48 |

FOREIGN PATENT DOCUMENTS

| | | |
|---|---|---|
| JP | 2004302317 | 10/2004 |
| WO | 2017051157 | 3/2017 |

OTHER PUBLICATIONS

"GB Application No. 1809490.4 Search Report, dated Dec. 10, 2018", 7 pages.
PCT Application No. PCT/GB2019/051592, International Search Report and Written Opinion, dated Aug. 28, 2019, 15 pages.
GB Application No. GB1809490.4 , "Examination Report, dated Feb. 16, 2022", 4 pages.

* cited by examiner

OPTICAL SWITCHING UNIT

FIELD

This invention relates to an optical switching unit.

BACKGROUND

Wavelength selective switches (WSSs) are components used in wavelength-division multiplexing (WDM) systems in optical communications networks to switch optical signals selectively by wavelength. The practice of WDM multiplies the available capacity of optical fibres by multiplexing several wavelengths and transmitting the combined signal through a single optical fibre. The combined signal can then be demultiplexed into its constituent wavelengths as needed in receiving equipment.

One useful form of WSS is the reconfigurable optical add-drop multiplexer (ROADM) which allows individual or multiple wavelengths to be added to and/or dropped from an optical fibre without the need to convert the signals on all of the WDM channels to electronic signals and back again to optical signals.

Figure 1:
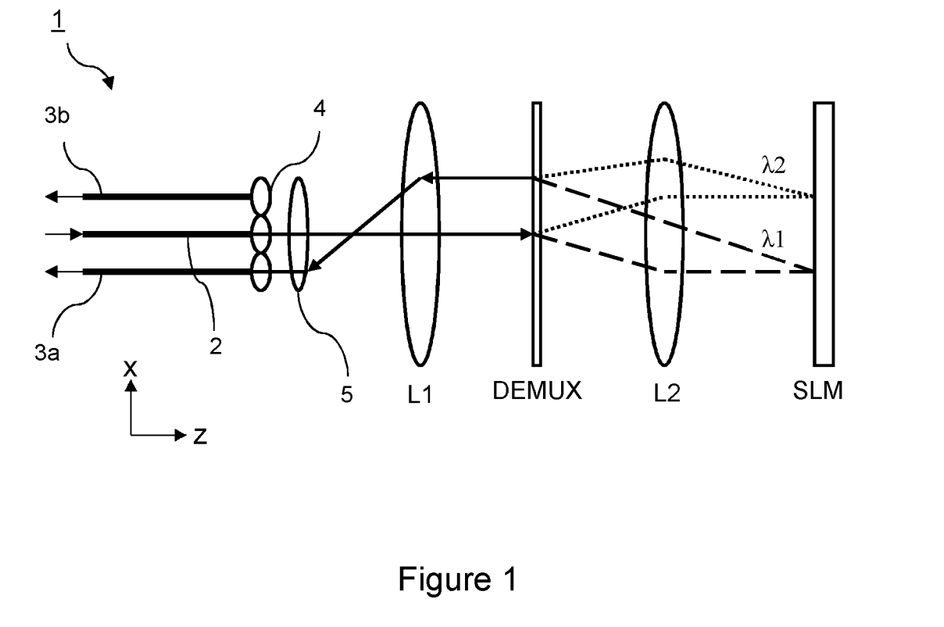
FIG. 1 shows a known design of optical switch.

FIG. 1 shows a known WSS 1 of the type described in WO/2017/051157 by Robertson et al. It describes of an array comprising an input fibre 2 and multiple output fibres 3a, 3b, . . . , 3N (only two are shown for simplicity). The system is viewed in the xz-plane, where the x-axis is the dispersion axis. In this configuration, light from the input fibre is collimated by its corresponding Fourier transform micro-lens arrangement 4 and 5. The light is then imaged by relay lenses L1 and L2. A diffraction grating is placed at the central relay Fourier transform plane. As the light passes through the demux, it is angularly separated into wavelengths λ1 and λ2 and focused by L2 to form spatially separated beams along the dispersion axis (x-axis). A liquid crystal on silicon device (LCOS) comprises a reconfigurable two-dimensional array of sub-holograms, wherein each sub-hologram is reconfigurable to steer a respective wavelength of the input light towards a selected output fibre, in this case fibre 3a. In some previous systems, such as that described in US 2005/0100277 by Frisken, beam steering is accomplished using rectangular sub-holograms that steer in only one plane.

If each sub-hologram displays a diffraction grating of a certain orientation and period, the beams will be re-imaged to intersect at a plane between lenses 5 and L1, whilst propagating in a direction influenced by the diffraction angle imparted by the sub-hologram. These angular deflections are then converted into the two-dimensional spatial offsets at the fibre plane by the corresponding lens in the Fourier transform micro-lens array.

Figure 2:
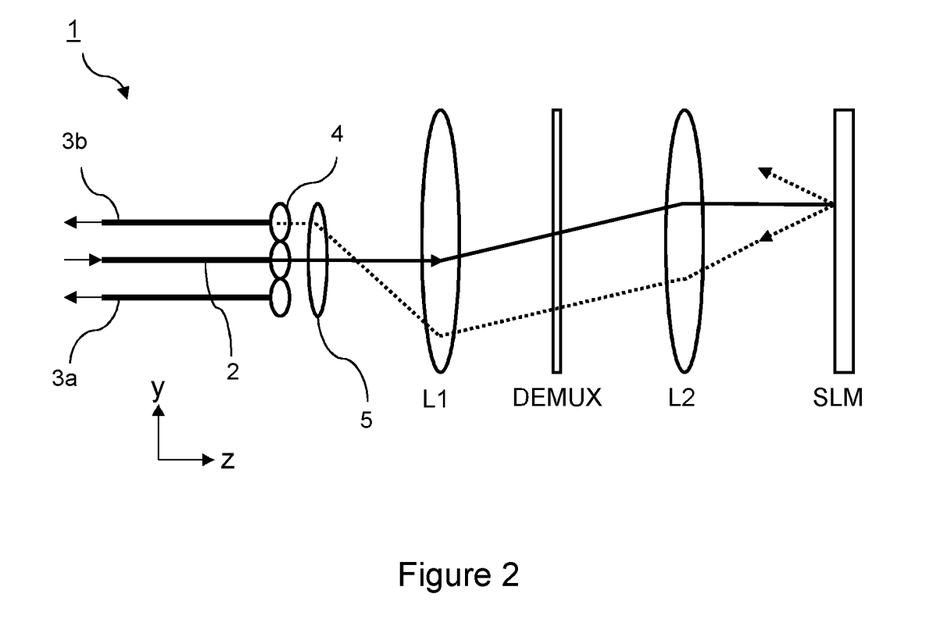
FIG. 2 shows the optical switch of FIG. 1 in the yz-plane.

FIG. 2 shows the same system as FIG. 1 but viewed in the yz-plane, where the y-axis is the WSS axis. From FIG. 2, it is apparent that the Fourier transform condition of the spherical optics combined with the square sub-holograms of the LCOS can provide two-dimensional beam steering into an output fibre.

Current WSS systems typically lack the ability to beam-steer in two dimensions as well as be optimally stacked without accepting serious design compromises.

There is a need for methods that at least partially address some of these problems.

SUMMARY OF THE INVENTION

According to the present invention there is provided an optical switching unit comprising a plurality of arrays of multiple optical waveguides; and a switching structure controllable to direct light received from any of the optical waveguides in a first array of the plurality of arrays to one or more optical waveguides of each other array in the plurality of arrays.

The optical switching unit may further comprise a plurality of optical assemblies, wherein each optical assembly is configured to pass light between the waveguides of one array of the plurality of arrays and the switching structure.

The first array may be an input array and a second array of the plurality of arrays may be an output array.

The switching structure may comprise a liquid crystal on silicon spatial light modulator controllable to direct light from the waveguides of the first array to the waveguides of the second array or to attenuate light received from the waveguides of the first array.

Each optical assembly may comprise a first Fourier lens configured to pass light between the waveguides of the corresponding array and the switching structure.

Each optical assembly may comprise multiple collimating lenses and each collimating lens is configured to pass light between a waveguide of the corresponding array and the switching structure.

The switching structure may comprise a wavelength demultiplexer arranged to disperse light received from the waveguides of the first array.

The wavelength demultiplexer may comprise a diffraction grating.

The switching structure may further comprise a spatial light modulator controllable to direct light from the waveguides of the first array to the waveguides of the second array or to attenuate light received from the waveguides of the first array; and the diffraction grating may comprise two or more segments and each segment is angled relative to the spatial light modulator about an axis along which the gratings lie.

The switching structure may further comprise a spatial light modulator controllable to direct light from the waveguides of the first array to the waveguides of the second array or to attenuate light received from the waveguides of the first array; and the diffraction grating is angled relative to the spatial light modulator about an axis along which the gratings lie.

Each optical assembly may comprise a first Fourier lens configured to pass light between the waveguides of the corresponding array and the switching structure; the switching structure may further comprise a spatial light modulator controllable to direct light from the waveguides of the first array to the waveguides of the second array, and a second Fourier lens situated between the demultiplexer and the spatial light modulator so as to pass light between the demultiplexer and the spatial light modulator; and wherein each optical assembly may be spaced from the diffraction grating such that light passing between the first and second Fourier lenses travels substantially the same distance.

The wavelength demultiplexer may comprise one or more prisms.

The switching structure may comprise a birefringent crystal and a polarisation rotator, wherein the birefringent crystal may be arranged to divide light received from the waveguides of the first array into polarisation components and the polarisation rotator may be configured to rotate one polarisation component such that light incident on the liquid crystal on silicon spatial light modulator is substantially linearly polarised.

The polarisation rotator may comprise at least one of: a patterned half-wave plate, and a liquid crystal polarisation rotator.

The birefringent crystal and polarisation rotator may be positioned adjacent to the liquid crystal on silicon spatial light modulator.

The switching structure may further comprise a birefringent crystal, wherein the birefringent crystal may be arranged to divide light received from the waveguides of the first array into orthogonal polarisation components; and the liquid crystal on silicon spatial light modulator may comprise a first portion and a second portion, the first portion having a director that is substantially aligned with a first polarisation component and the second portion having a director that is substantially aligned with a second polarisation component, the second polarisation component being orthogonal to the first polarisation component.

The birefringent crystal may be positioned adjacent to the liquid crystal on silicon spatial light modulator.

The switching structure may comprise a microelectromechanical spatial light modulator controllable to direct light received from the waveguides of the first array to the second array or to attenuate light received from the waveguides of the first array.

The plurality arrays may be arranged in one of: a rectangular array, a centred pentagonal array, a centred hexagonal array, a centred heptagonal array, a centred octagonal array and a centred nonagonal array.

Each array of the plurality of arrays may be a linear array. Each optical waveguide may comprise optical fibres.

There is also provided an optical switching unit comprising: a plurality of arrays of multiple optical waveguides comprising a first array of multiple optical waveguides and a second array of multiple optical waveguides; a switching structure controllable to reflectively direct light between waveguides of the first array and waveguides of the second array; a first optical assembly centred on a first optical axis for passing light between the waveguides of the first array and the switching structure; and a second optical assembly centred on a second optical axis for passing light between the waveguides of the second array and the switching structure.

The first array may be an input array and the second array may be an output array.

The switching structure may comprise a liquid crystal on silicon spatial light modulator controllable to direct light from the waveguides of the first array to the waveguides of the second array or to attenuate light received from the waveguides of the first array.

Each optical assembly may comprise a first Fourier lens configured to pass light between the waveguides of the corresponding array and the switching structure.

Each optical assembly may comprise multiple collimating lenses and each collimating lens is configured to pass light between a waveguide of the corresponding array and the switching structure.

The switching structure may comprise a wavelength demultiplexer arranged to disperse light received from the waveguides of the first array.

The wavelength demultiplexer may comprise a diffraction grating.

The switching structure may further comprise a spatial light modulator controllable to direct light from the waveguides of the first array to the waveguides of the second array or to attenuate light received from the waveguides of the first array; and the diffraction grating may comprise two or more segments and each segment is angled relative to the spatial light modulator about an axis along which the gratings lie.

The switching structure may further comprise a spatial light modulator controllable to direct light from the waveguides of the first array to the waveguides of the second array or to attenuate light received from the waveguides of the first array; and the diffraction grating is angled relative to the spatial light modulator about an axis along which the gratings lie.

Each optical assembly may comprise a first Fourier lens configured to pass light between the waveguides of the corresponding array and the switching structure; the switching structure may further comprise a spatial light modulator controllable to direct light from the waveguides of the first array to the waveguides of the second array, and a second Fourier lens situated between the demultiplexer and the spatial light modulator so as to pass light between the demultiplexer and the spatial light modulator; and wherein each optical assembly may be spaced from the diffraction grating such that light passing between the first and second Fourier lenses travels substantially the same distance.

The wavelength demultiplexer may comprise one or more prisms.

The switching structure may comprise a birefringent crystal and a polarisation rotator, wherein the birefringent crystal may be arranged to divide light received from the waveguides of the first array into polarisation components and the polarisation rotator may be configured to rotate one polarisation component such that light incident on the liquid crystal on silicon spatial light modulator is substantially linearly polarised.

The polarisation rotator may comprise at least one of: a patterned half-wave plate, and a liquid crystal polarisation rotator.

The birefringent crystal and polarisation rotator may be positioned adjacent to the liquid crystal on silicon spatial light modulator.

The switching structure may further comprise a birefringent crystal, wherein the birefringent crystal may be arranged to divide light received from the waveguides of the first array into orthogonal polarisation components; and the liquid crystal on silicon spatial light modulator may comprise a first portion and a second portion, the first portion having a director that is substantially aligned with a first polarisation component and the second portion having a director that is substantially aligned with a second polarisation component, the second polarisation component being orthogonal to the first polarisation component.

The birefringent crystal may be positioned adjacent to the liquid crystal on silicon spatial light modulator.

The switching structure may comprise a microelectromechanical spatial light modulator controllable to direct light received from the waveguides of the first array to the second array or to attenuate light received from the waveguides of the first array.

The plurality arrays may be arranged in one of: a rectangular array, a centred pentagonal array, a centred hexagonal array, a centred heptagonal array, a centred octagonal array and a centred nonagonal array.

Each array of the plurality of arrays may be a linear array. Each optical waveguide may comprise optical fibres.

The liquid crystal on silicon spatial light modulator may be transmissive or reflective.

The switching structure may be controllable to direct light from any of the waveguides of the input array to one or more of the waveguides of each of the output arrays or to attenuate light received from the waveguides of the input array in dependence on the wavelength of the light.

The switching structure may be controllable to direct light between each of the waveguides of the first array and each of the waveguides of each of the further arrays.

DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Figure 3:
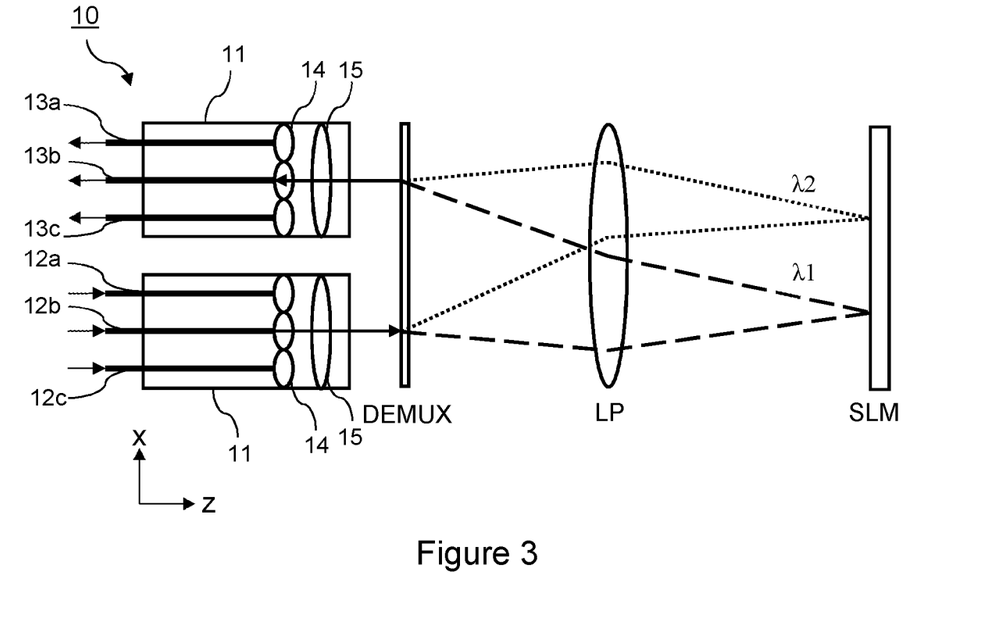
FIG. 3 shows a first exemplary optical switch viewed in the xz-plane.

FIG. 3 illustrates an exemplary WSS viewed in the xz-plane. An array of input waveguides $12a$, $12b$, $12c$ input light to a Fourier transform assembly 11. Though three waveguides are shown for simplicity, there may be an arbitrary number, Q, of input waveguides. In one arrangement there are 4 input waveguides. It may be advantageous to use a commercially available waveguide array as the input waveguide array.

Figure 4:
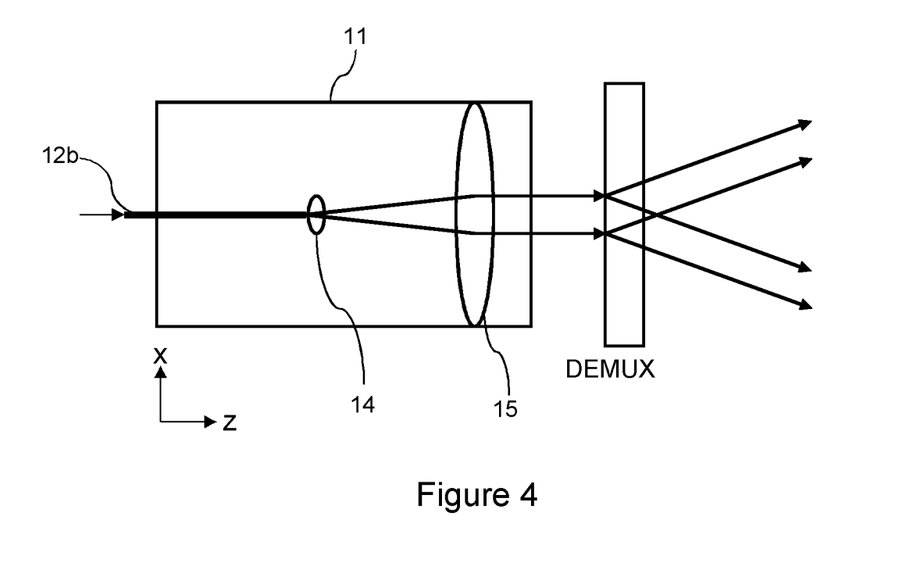
FIG. 4 shows a Fourier transform assembly of the first exemplary optical switch viewed in the xz-plane.

Detail of the arrangement within Fourier transform assembly 11 in the xz-plane is shown in FIG. 4. An array of micro-lenses 14 may be used, with one micro-lens per waveguide. The micro-lens 14 acts to reduce the beam divergence of the input beam and the associated numerical aperture (NA) of the switch optics. NA is a measure of the light gathering capacity of an optical system.

Figure 5:
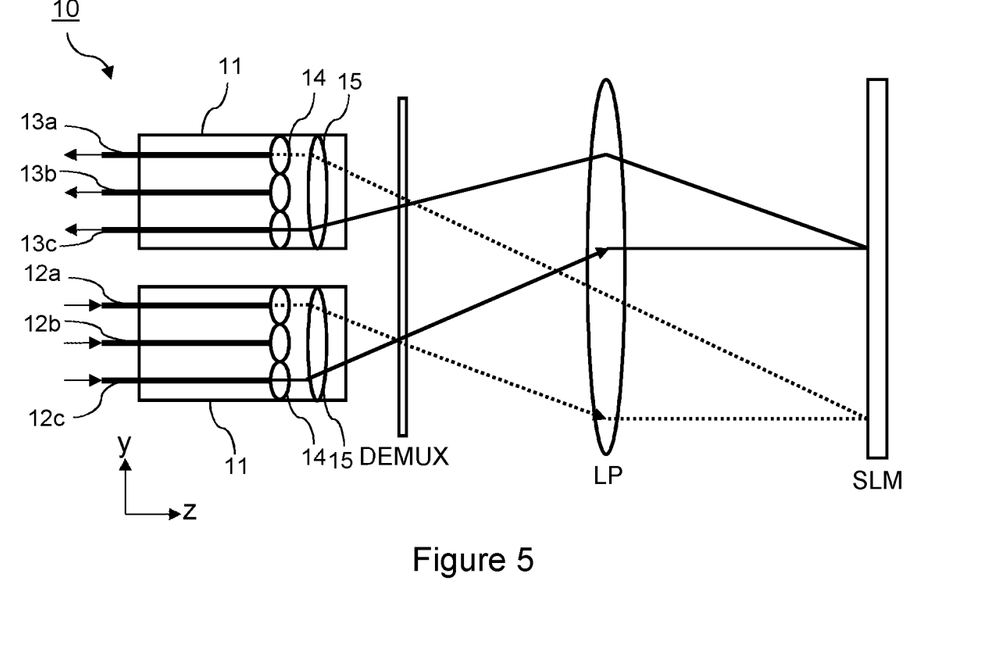
FIG. 5 shows the exemplary WSS of FIG. 3 viewed in the yz-plane.

FIG. 5 shows the WSS unit 10 in yz-plane. As, in the example given, the beams are dispersed in the x-direction, the beams are not deflected or dispersed when viewed in the yz-plane.

FIGS. 3 and 5 show two Fourier transform assemblies 11 that are each centred on different optical axes. Each Fourier transform assembly 11 may be centred on respective optical axis. Each respective optical axis can be considered to be a line passing through the centre of curvature of the respective Fourier lenses 15 about which there is some degree of rotational symmetry. The optical axes of the Fourier transform assemblies 11 shown in FIGS. 3 and 5 are parallel but offset. The optical axes of the Fourier transform assemblies 11 shown in FIGS. 3 and 5 are not coincident, i.e. they are distinct and do not lie exactly on top of each other. The optical axes of the Fourier transform assemblies 11 may be parallel or non-parallel.

Figure 6:
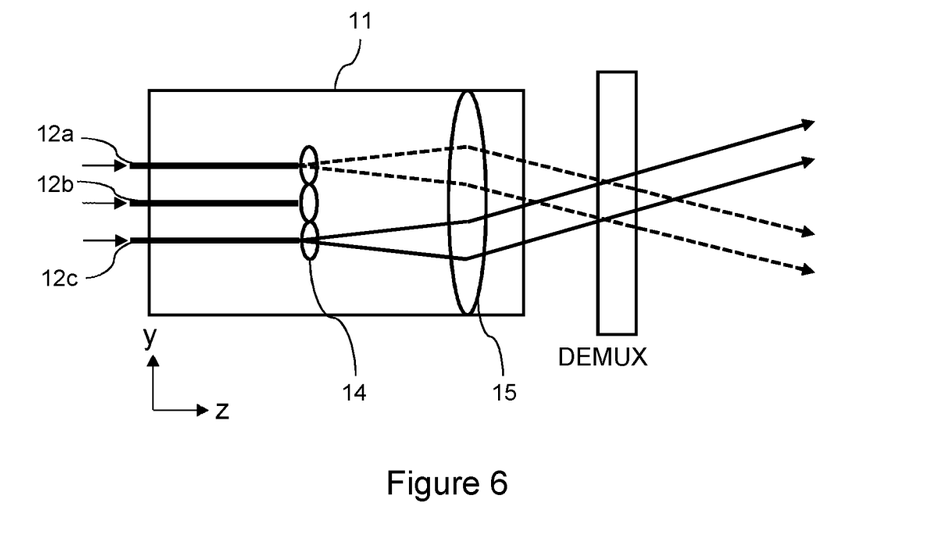
FIG. 6 shows the Fourier transform assembly of FIG. 4 viewed in the yz-plane.

FIG. 6 shows a Fourier transform assembly 11 in the yz-plane. After passing through micro-lens 14, each beam passes through the first Fourier transform lens 15. As can be seen from the two example beams originating from waveguides $12a$ and $12c$ in FIG. 6, the lens 15 converts the position of an input beam (i.e. its displacement along the y-axis) into a unique propagation angle (i.e. the angle between the direction of propagation and the z-axis). Lens 15 will advantageously be spaced one focal length (of lens 15) away from lens 14. For example, the lens 15 may be between 80% and 120% of one focal length (of lens 15) away from lens 14 or between 90% and 110% of one focal length (of lens 15) away from lens 14.

Returning to the views of FIGS. 3 and 4, after an input beam leaves the Fourier transform assembly 11, it passes through a demultiplexer, labelled demux. The demux may be one or more of, for example, a diffraction grating, a dispersive prism, or a grating and dispersive prism combined in a grism. The gratings used may be ruled, holographic, echelle or transmission gratings. The demux angularly separates the input beam into its constituent wavelengths channels, labelled as $\lambda 1$ and $\lambda 2$ in FIG. 3.

The demux will advantageously be spaced one focal length (of lens 15) away from lens 15 when the system is arranged in a linear manner, as shown in FIGS. 3 and 5. The demux may be between 80% and 120% of one focal length (of lens 15) away from lens 15 or between 90% and 110% of one focal length (of lens 15) away from lens 15. When lens 14 and the demux are each placed one focal length (of lens 15) away from lens 15, i.e. in a 2f arrangement, insertion loss on the beam's return path will be minimised.

The dispersed wavelength channels may then be focused by the second Fourier transform lens LP.

The individual wavelength channels are then incident on a spatial light modulator (SLM). The SLM may be an LCOS device, a microelectromechanical (MEMS) device or any other suitable device. In the case of an LCOS device, the SLM comprises an array of individually controllable sub-holograms. Each sub-hologram is an area of the SLM device that can display a diffraction grating of a controllable period and controllable angle. As the wavelengths of the input beam have been separated at the demux, the SLM can switch each wavelength channel independent of and without interfering with the light in the other channels. In other words, the SLM may be controllable to direct light in dependence on the wavelength of said light. In this context, switching should be understood to mean redirecting or attenuating. The individual sub-holograms may tile the SLM with substantially no gaps in between and may cover the whole or part of the SLM. The sub-holograms may be substantially square in shape. The properties of the switch, such as the dispersion qualities of the demux, the focal lengths of the various lenses, and the configuration of the SLM may be optimised such that, for a given input, each wavelength channel illuminates a separate sub-hologram. The SLM may reflectively direct light (as is shown in FIGS. 1, 2, 3 and 5) or it may transmissively direct light. Though the Figures show a single SLM, two, three, four or more SLMs may be used. As is described above, the SLM is controllable to direct light received from any of the optical waveguides in an input array to one or more optical waveguides of each output array.

Figure 7:
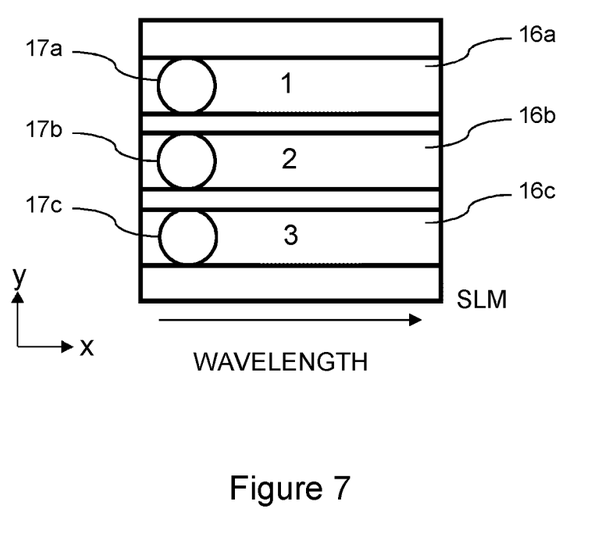
FIG. 7 shows an example of an SLM.

An example of an SLM is shown in FIG. 7. The light from three input waveguides is projected onto the SLM. In this example the axes are consistent with those in FIGS. 3 to 6, with light from the different input waveguide being separated vertically as represented by rectangular regions 16a, 16b and 16c, whilst the wavelength channels from each input waveguide are separated horizontally onto areas represented by 17a, 17b and 17c.

The sub-holograms of the SLM operate to redirect the wavelength channels as desired. In the example shown in FIG. 3, λ1 and λ2 are directed so as to recombine at the demux (now operating as a multiplexer). To achieve such a result, the demux and the SLM can be located at a distance from LP equal to the focal length of LP.

The beams are deflected towards their desired output waveguides by the SLM. The beams pass through LP and through the demux. Lens 15 then has the inverse effect it did on the input beams, and it converts the unique propagation angle of each return beam to the position of an output waveguide. It should be noted that the SLM could equally redirect λ1 and λ2 to separate output waveguides, thus not recombining at the demux.

Figure 15:
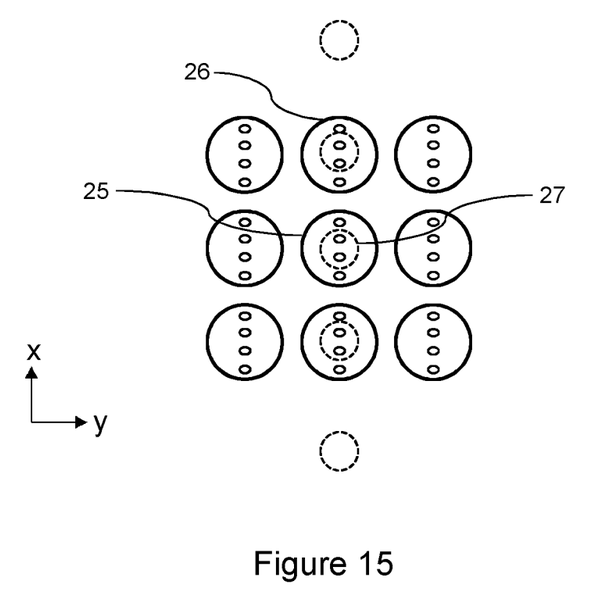
FIGS. 15 and 16 show arrangements of input and output waveguides.
Figure 16:
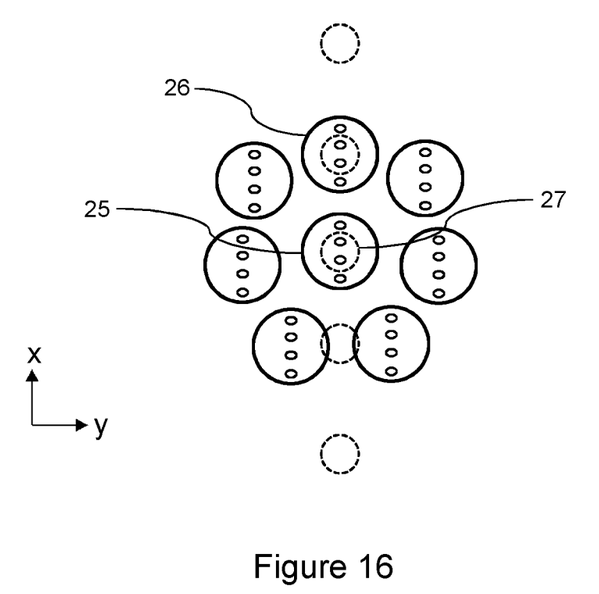

In the examples shown in FIGS. 3 and 5, only one array of output waveguides is shown. Any number, N, of output arrays may be used, with the value of N limited only by space constraints and the maximum deflection that a particular SLM is able to impart. FIGS. 9 to 13 show examples with 1 input waveguide array and 2 output waveguide arrays. FIGS. 15 and 16 show examples with 9 and 8 arrays of waveguides respectively. There may be 2, 3, 4, 5, 6, or more than 6 arrays of waveguides. Though the waveguides are referred to as input and output waveguides, the switch is generally reversible with any array of waveguides able to act as an input array.

The number of output waveguides in each of the N output arrays may be any arbitrary number. The number of output waveguides in each output waveguide array may equal the number of input waveguides. If the number of output waveguides in each of the N output waveguides arrays equals the number of input waveguides Q, then the stacked WSS arrangement forms Q 1×N WSSs. In one arrangement there are 4 output waveguides in each output waveguide array. There may be 3, 4, 5, 6, 7, 8, 9, or more than 9 waveguides in each array of waveguides. It may be advantageous to use commercially available waveguide arrays as the output waveguide arrays.

FIG. 5 shows an example of the WSS operating in the yz-plane. In this case, two separate beams from 12a and 12c are shown as a dotted line and a solid line respectively. As already discussed with respect to FIG. 6, lens 15 converts the position of an input waveguide into a unique propagation angle. When viewed in this plane the beams are unaffected by the demux. Second Fourier transform lens LP then converts the propagation angle of each beam to a unique position in the y-direction, ensure that inputs from different fibres are directed to the desired sub-hologram row, labelled as 1, 2 and 3 in FIG. 7.

The beams are then deflected towards their desired output waveguides by the SLM. The beams pass through LP and through the demux. Lens 15 then has the inverse effect as it did on the input beams, and it converts the unique propagation angle of each return beam to the position of an output waveguide.

The WSS is depicted in FIGS. 3 and 5 in a linear arrangement but it will be apparent to the skilled person that the system may be folded into a more compact arrangement by way of mirrors, or as is described later, by tilting certain optical components (i.e. by rotating them about the x- or y-axes), for example the lenses, demux or SLM.

The optical waveguides may be optical fibres, strip waveguides, rib waveguides, segmented or photonic crystal waveguides. The waveguides within an individual waveguide array may be linear, in a grid arrangement, or in any other suitable arrangement.

The WSS may operate at any wavelengths suitable for optical communication. In particular, the WSS may operate at any of the telecom optical wavelength bands, such as the O-, E-, S-, C- and L-bands.

Tilted Demux

Figure 8:
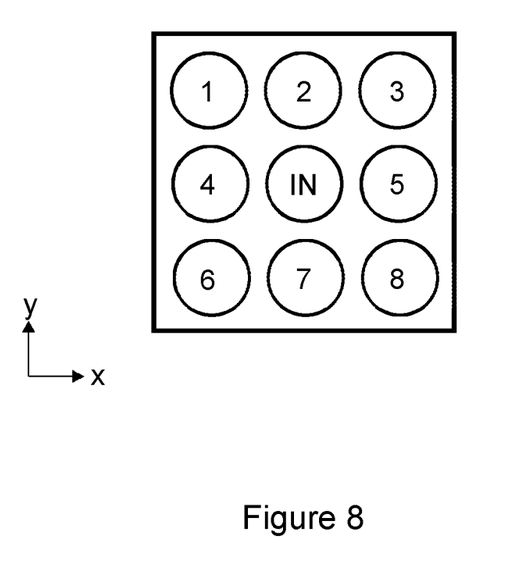
FIG. 8 shows the relative locations of beams routed to a specific output port at a demux.

From FIGS. 3 and 5, it is clear that the returning beam will illuminate different areas of the demux. FIG. 8 shows the relative locations of beams routed to a specific output port at the demux, in a system where N=8. The area marked IN corresponds to the position where the input beams from the Q input waveguides overlap. Areas 1 to 8 represent the positions of the 8 output waveguide arrays.

Figure 9:
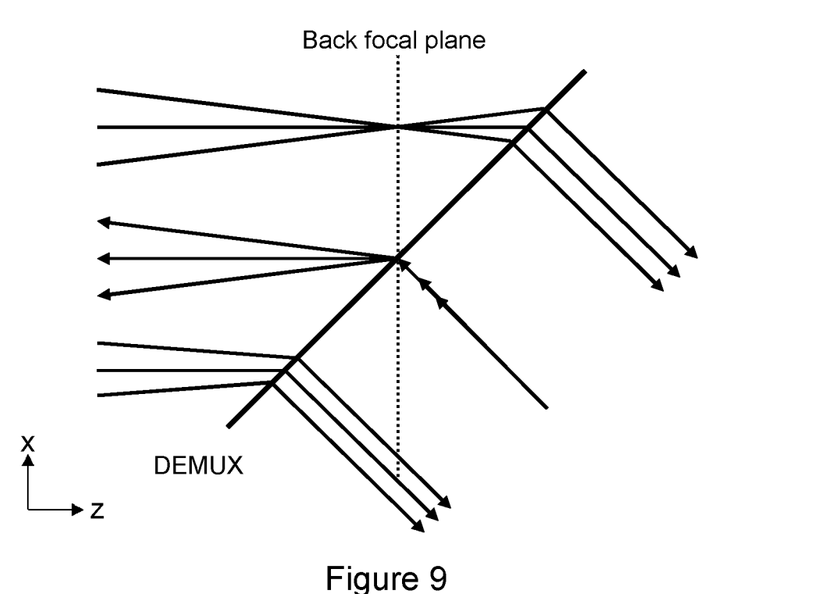
FIGS. 9, 10 and 11 show the paths of beams in a tilted WSS architecture.

In FIGS. 3 and 5 the system is drawn on axis. The demultiplexing assembly may be used in a tilted geometry such as that shown in FIGS. 9, 10 and 11. In this tilted geometry, the demux no longer lies flat in the xy-plane, but is instead rotated about the y-axis. In the case where the demux is a diffraction grating, the gratings will generally lie along the y-axis. This arrangement results in the input and output beams being angularly separated by a large angle between LP and the demux. Using an angled demux maximises dispersion. FIGS. 9, 10, 11, 12 and 13 each show an input beam (central) and two switched wavelength channels (top and bottom). In FIG. 9 each of the output beams has been focused onto the back focal plane by LP. As the back focal plane is not coincident with the plane of the demux, the beams of the different output wavelength channels no longer spatially overlap at the demux. In FIGS. 9 to 13, the beams entering and leaving the demux on the right hand side are shown normal to the demux, though this will not necessarily be the case.

Figure 10:
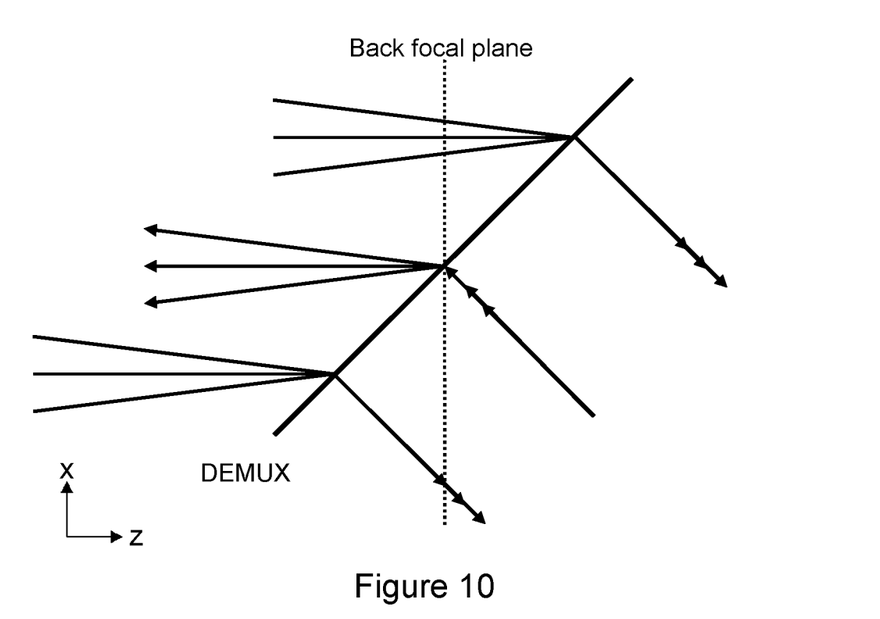
Figure 11:
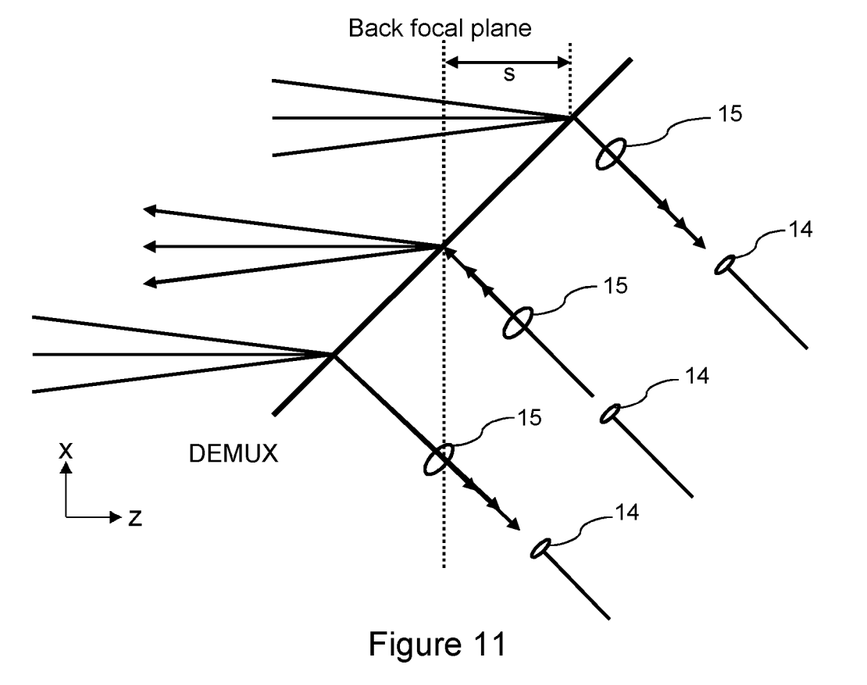

The period of the sub-holograms can be optimized in order to ensure that the wavelength channels overlap at the grating in the xz-plane, as shown in FIG. 10. However, in the yz-plane the beams will still be focused onto the back focal plane. Thus, if Fourier transform assemblies comprising lenses 14 and 15 are all placed equidistant from such a tilted demux, then there will not be a 2f condition between the back focal plane, lens 15 and lens 14. To overcome this problem, the Fourier transform assemblies for each beam may be staggered by a distance s, which is the distance from the back focal plane to the demux. Such an arrangement ensures that light passing between lens LP and lens 15 must travel a substantially the same distance between these two lenses. FIG. 11 shows such an arrangement. The Fourier transform assembly for the top beam is placed at a distance from the demux equal to the focal length of lens 15 minus s, or within 80% and 120% or within 90% and 110% of this distance. The Fourier transform assembly for the bottom beam is placed at a distance from the demux equal to the focal length of lens 15 plus s, or within 80% and 120% or within 90% and 110% of this distance.

Figure 12:
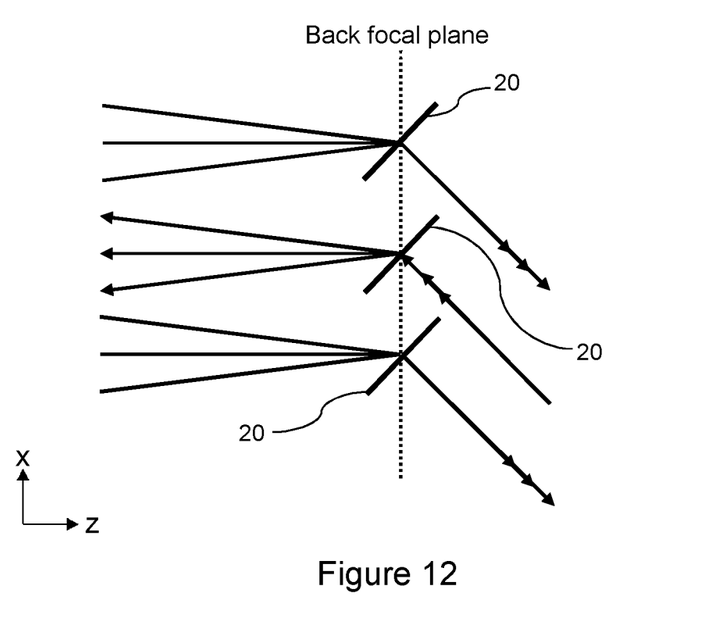
FIG. 12 illustrates an arrangement with linearly arranged sub-demuxers.

The demux may also comprise several sub-demultiplexers 20. Using sub-demuxers removes the constraints imposed by having one planar demux. The sub-demuxers can be arranged independently. In one arrangement, each waveguide array (input and output) may have a dedicated sub-demux. FIG. 12 shows an arrangement where the sub-demuxers are arranged linearly. Each sub-demux may be positioned such that the wavelength channels overlap at the sub-demux. The arrangement of FIG. 12 also removes the need for the Fourier transform assemblies to be staggered as they are in the example of FIG. 11. Each Fourier transform assembly may be associated with a respective sub-demux. When the sub-demuxers are diffraction gratings, each grating may be optimised for a respective wavelength channel. Optimisations may include selecting a grating with one or more of a desired efficiency, resolving power, blaze wavelength or wavelength range.

Figure 13:
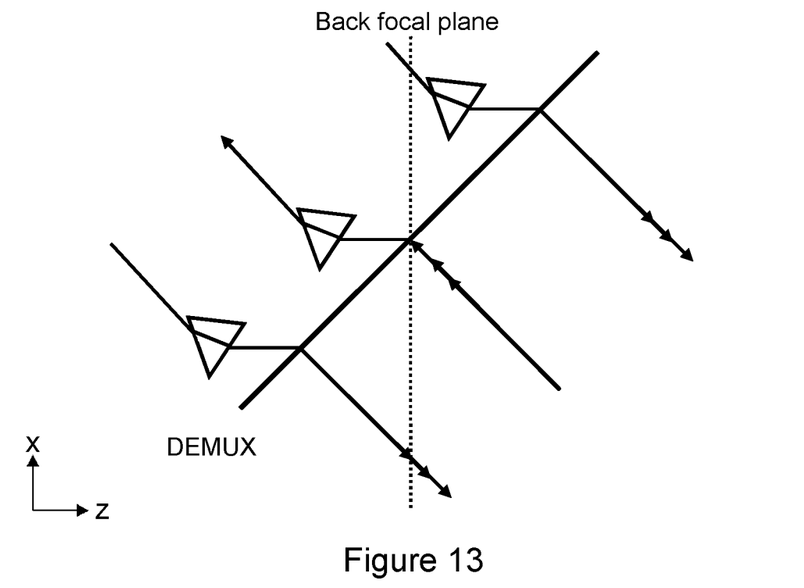
FIG. 13 illustrates an arrangement with an array of compensating prisms.

Most demuxers will not disperse light such that wavelength channels are equally spaced at the SLM plane, i.e. the wavelengths are dispersed non-linearly. To compensate for this non-linear dispersion a prism, array of prisms, or a GRISM arrangement may be used. Such compensation components should have dispersion characteristics (i.e. variation of refractive index with wavelength) to compensate. The prism, array of prisms, or GRISM may be arranged to ensure that the spacing of channels at the SLM plane is uniform for a given spectral channel width. FIG. 13 shows a proposed approach in which an array of compensating prisms is used. Each compensating prism may be associated with an array of waveguides. This can allow smaller prisms to be used (thus reducing associated absorption) and may make fabrication of the device easier.

Polarization Diversity

Optical signals entering the WSS will generally have an undefined polarisation. If the switch optics are polarisation insensitive that this is not problematic. If the device is polarisation sensitive, such as when a nematic LCOS device is used, the incident polarisation must be aligned parallel to the liquid crystal director in order to ensure maximum diffraction efficiency. Nematic liquid crystals are rod-shaped birefringent molecules that preferentially orientate to be parallel to one another. The director of a liquid crystal is defined as the direction the long axes of the liquid crystal molecules point in, with the ordinary refractive index being perpendicular to the director and the extraordinary refractive index being parallel to the director.

Figure 14:
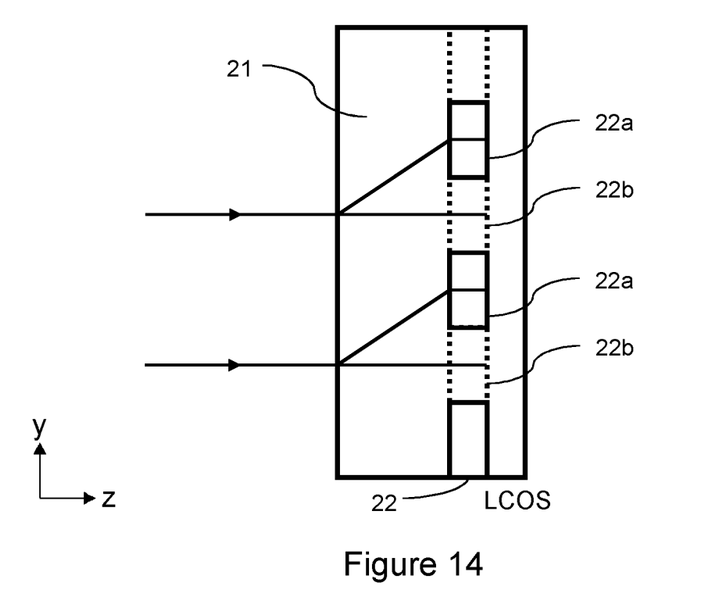
FIG. 14 shows an architecture comprising a birefringent walkoff crystal.

FIG. 14 shows a proposed solution comprising a birefringent walkoff crystal 21 and patterned half-wave plate 22 placed before an LCOS device. Such a device is useful in situations where the de-multiplexing assembly (and all optics prior to the birefringent crystal) is polarisation insensitive. Beams incident on the birefringent crystal are separated into transverse electric (TE) and transverse magnetic (TM) polarisation components. The separation of the polarisation components may be equal to offset between sub-hologram rows on the LCOS. In this example the director of the LCOS device is oriented parallel to the TE polarisation direction, i.e. the light that is polarised parallel to the phase modulating axis of the LCOS device. The separated polarisation components then pass through the appropriate parts of a patterned half-wave plate 22. The patterned half-wave plate is arranged such that the TM component passes through a half-wave plate 22a and is rotated to a TE configuration whilst the TE component passes through optically isotropic portion 22b and does not have its polarisation altered. As the beams are incident on the LCOS, all components are in the TE configuration as desired. Such spatial polarisation rotation may be achieved by other means, such as a patterned liquid crystal based polarisation rotator device. Alternatively, the LCOS device itself may be patterned such that different areas have orthogonal director directions. The patterned half-wave plate, patterned liquid crystal based polarisation rotator device and pattern LCOS may comprise alternating rows, or an alternating 'checkerboard' pattern for receiving orthogonal polarisation components.

The beams are then independently deflected by the grating phase profile displayed on the LCOS device and retrace back through the patterned half-waveplate. The polarisation component that was rotated through 90° on the input path is rotated again through 90° by the patterned half-waveplate on the output path. The beams are finally made colinear on the return path through the waveplate, but maintain the same deflection angle. Small differences in beam propagating angle between the two components can be compensated for by adjusting one of the grating periods of the sub-holograms.

Each pair of polarisation components may be incident on adjacent rows of sub-holograms. In this case, there will therefore be twice the number of sub-hologram rows as there are incident beams. In the arrangement shown, the birefringent crystal and half-wave plate are adjacent to each other and adjacent to the LCOS device. This need not be the case as the birefringent crystal and patterned half-wave plate may be interposed at any point between the last of the polarisation insensitive optics and the LCOS device.

Crosstalk Reduction

Due to spatial and phase quantization, and to imperfections in the display of the phase profile introduced by pixel voltage leakage and liquid crystal viso-elastic effects, light from some SLMs will also be diffracted into other diffraction orders associated with the sub-hologram period and orientation. This is shown in FIG. 15, where an array of input waveguides 25 is surrounded by (in this case) 8 arrays of output waveguides 26. In this example the waveguide arrays each comprise four optical fibres arranged linearly. In this example, the $0^{th}$ diffraction order 27 is incident on the input array 25, whilst the +1 order (the signal) is incident on the output array above. However, in this square configuration, the −1 diffraction order is incident on the output array below, resulting in undesirable 'crosstalk'.

Crosstalk may be reduced by way altering the arrangement of output arrays. FIG. 16 shows an example where the output arrays are arranged in a centred heptagonal arrangement around a central input array. The centred heptagonal arrangement may result in the −1 diffraction order being incident half-way between two output port locations. Thus, less than 50% of this crosstalk signal will couple to an output waveguide due to the mode overlap theorem. Possible symmetric arrangements include the rectangular gird, a centred hexagonal pattern and a centred octagonal pattern. Possible asymmetric arrangements include a centred pentagonal pattern, a centred heptagonal pattern and a centred nonagonal pattern.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An optical switching unit comprising:
   a plurality of arrays of multiple optical waveguides comprising a first array of multiple optical waveguides and a plurality of further arrays of multiple optical waveguides, wherein the first array is an input array and the further arrays are output arrays;
   a switching structure controllable to direct light between any of the waveguides of the first array and one or more of the waveguides of each of the further arrays, wherein the switching structure comprises a wavelength demultiplexer arranged to disperse light received from the waveguides of the input array;
   a first optical assembly centred on a first optical axis and configured to pass light between the waveguides of the first array and the switching structure; and
   a plurality of further optical assemblies, each centred on a respective further optical axis and configured to pass light between the waveguides of a further array of the plurality of further arrays and the switching structure, wherein at least one of the further optical axes is different to the first optical axis and wherein each optical assembly comprises a first Fourier lens configured to pass light between the waveguides of the corresponding array and the switching structure.

2. An optical switching unit as claimed in claim 1, wherein the switching structure comprises a liquid crystal on silicon spatial light modulator controllable to direct light from any of the waveguides of the input array to one or more of the waveguides of each of the output arrays or to attenuate light received from the waveguides of the input array.

3. An optical switching unit as claimed in claim 2, wherein the liquid crystal on silicon spatial light modulator is transmissive or reflective.

4. An optical switching unit as claimed in claim 2, wherein the switching structure further comprises a birefringent crystal and a polarisation rotator, wherein the birefringent crystal is arranged to divide light received from the waveguides of the input array into orthogonal polarisation components and the polarisation rotator is configured to rotate one polarisation component such that light incident on the liquid crystal on silicon spatial light modulator is substantially linearly polarised.

5. An optical switching unit as claimed in claim 4, wherein the polarisation rotator comprises at least one of: a patterned half-wave plate, and a liquid crystal polarisation rotator, and wherein the birefringent crystal and polarisation rotator are positioned adjacent to the liquid crystal on silicon spatial light modulator.

6. An optical switching unit as claimed in claim 2, wherein the switching structure further comprises a birefringent crystal positioned adjacent to the liquid crystal on silicon spatial light modulator, wherein:
   the birefringent crystal is arranged to divide light received from the waveguides of the input array into orthogonal polarisation components; and
   the liquid crystal on silicon spatial light modulator comprises a first portion and a second portion, the first portion having a director that is substantially aligned with a first polarisation component and the second portion having a director that is substantially aligned with a second polarisation component, the second polarisation component being orthogonal to the first polarisation component.

7. An optical switching unit as claimed in claim 1, wherein each optical assembly comprises multiple collimating lenses and each collimating lens is configured to pass light between a waveguide of the corresponding array and the switching structure.

8. An optical switching unit as claimed in claim 1, wherein:
   the switching structure further comprises a spatial light modulator controllable to direct light from any of the waveguides of the input array to one or more of the waveguides of each of the output arrays or to attenuate light received from the waveguides of the input array; and
   the wavelength demultiplexer comprises a diffraction grating which comprises two or more segments and each segment is angled relative to the spatial light modulator about an axis along which the gratings lie.

9. An optical switching unit as claimed in claim 1, wherein:
   the switching structure further comprises a spatial light modulator controllable to direct light from any of the waveguides of the input array to one or more of the waveguides of each of the output arrays or to attenuate light received from the waveguides of the input array; and
   the wavelength demultiplexer comprises a diffraction grating which is angled relative to the spatial light modulator about an axis along which the gratings lie.

10. An optical switching unit as claimed in claim 9 wherein:
    each optical assembly comprises a first Fourier lens configured to pass light between the waveguides of the corresponding array and the switching structure;
    the switching structure further comprises a spatial light modulator controllable to direct light from any of the waveguides of the input array to one or more of the waveguides of each of the output arrays, and a second Fourier lens situated between the demultiplexer and the spatial light modulator so as to pass light between the demultiplexer and the spatial light modulator; and
    wherein each optical assembly is spaced from the diffraction grating such that light passing between the first and second Fourier lenses travels substantially the same distance.

11. An optical switching unit as claimed in claim 1, wherein the wavelength demultiplexer comprises one or more prisms.

12. An optical switching unit as claimed in claim 1, wherein the switching structure comprises a microelectromechanical spatial light modulator controllable to direct light received from any of the waveguides of the input array to one or more of the waveguides of each of the output arrays or to attenuate light received from the waveguides of the input array.

13. An optical switching unit as claimed in claim 1, wherein the plurality of arrays are arranged in one of: a rectangular array, a centred pentagonal array, a centred hexagonal array, a centred heptagonal array, a centred octagonal array and a centred nonagonal array.

14. An optical switching unit as claimed in claim 1, wherein the first array and each of the plurality of further arrays is a linear array.

15. An optical switching unit as claimed in claim 1, wherein each optical waveguide comprises optical fibres.

16. An optical switching unit as claimed in claim 1, wherein the switching structure is controllable to direct light from any of the waveguides of the input array to one or more of the waveguides of each of the output arrays or to attenuate light received from the waveguides of the input array in dependence on the wavelength of the light.

17. An optical switching unit as claimed in claim 1, wherein the switching structure is controllable to direct light between each of the waveguides of the first array and each of the waveguides of each of the further arrays.

* * * * *